US007360792B2

(12) United States Patent
Turturiello et al.

(10) Patent No.: US 7,360,792 B2
(45) Date of Patent: Apr. 22, 2008

(54) POWER WHEELCHAIR

(75) Inventors: George A. Turturiello, Honesdale, PA (US); Michael J. Rozaieski, Drums, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 340 days.

(21) Appl. No.: 11/252,491

(22) Filed: Oct. 18, 2005

(65) Prior Publication Data

US 2006/0082117 A1 Apr. 20, 2006

Related U.S. Application Data

(60) Provisional application No. 60/620,481, filed on Oct. 20, 2004.

(51) Int. Cl.
*B60R 21/00* (2006.01)

(52) U.S. Cl. .................................................... 280/755

(58) Field of Classification Search ................ 280/755, 280/767, 282, 304.1; 180/282, 907; 297/270.1, 297/270.5, 271.2, 271.4, 272.4, DIG. 4
See application file for complete search history.

(56) References Cited

U.S. PATENT DOCUMENTS

| | | | | |
|---|---|---|---|---|
| 1,327,864 | A | 1/1920 | Everingham | |
| 3,580,591 | A | 5/1971 | Coffey | 280/5.32 |
| 3,905,437 | A | 9/1975 | Kaiho et al. | 180/15 |
| 4,245,847 | A | 1/1981 | Knott | 280/5.2 |
| 4,310,167 | A | 1/1982 | McLaurin | 280/5.28 |
| 4,614,246 | A | 9/1986 | Masse et al. | 180/6.5 |
| 4,830,567 | A | 5/1989 | Rachman | 414/678 |
| 5,113,959 | A | 5/1992 | Mastov et al. | 180/11 |
| 5,222,567 | A | 6/1993 | Broadhead et al. | 180/15 |
| 5,435,404 | A | 7/1995 | Garin, III | 180/6.5 |
| 5,564,512 | A | 10/1996 | Scheulderman | 180/65.5 |
| 5,944,131 | A | 8/1999 | Schaffner et al. | 180/65.1 |
| 6,047,979 | A | 4/2000 | Kraft et al. | 280/250.1 |
| 6,062,600 | A | 5/2000 | Kamen et al. | 280/755 |
| 6,105,706 | A * | 8/2000 | Cooper | 180/282 |
| 6,312,000 | B1 | 11/2001 | Pauls et al. | 280/250.1 |
| 6,923,278 | B2 * | 8/2005 | Mulhern et al. | 180/65.1 |
| 2005/0151360 | A1 * | 7/2005 | Bertrand et al. | 280/755 |
| 2005/0206149 | A1 * | 9/2005 | Mulhern et al. | 280/755 |

FOREIGN PATENT DOCUMENTS

| | | |
|---|---|---|
| FR | 2 498 925 | 6/1982 |

(Continued)

*Primary Examiner*—Faye M. Fleming
(74) *Attorney, Agent, or Firm*—DLA Piper US LLP

(57) ABSTRACT

A power wheelchair is capable of operating in either a two-wheel or a four-wheel drive configuration. The wheelchair includes first and second forward drive wheels in contact a supporting surface. First and second wheel support assemblies each include a support member pivotally connected to the wheelchair frame. Each wheel support assembly further includes a rear drive wheel and a rear non-driven wheel connected to the support member. At least one actuator is provided to control movement of the support members to pivot between a first position and a second position. In the first position, the rear non-driven wheel is moved into contact with the supporting surface and the rear drive wheel is moved out of contact with the supporting surface. In the second position the rear drive wheel is moved into contact with the supporting surface.

8 Claims, 7 Drawing Sheets

FOREIGN PATENT DOCUMENTS

| | | | |
|---|---|---|---|
| FR | 2574740 | A1 * | 6/1986 |
| JP | 2562792 | | 9/1996 |
| JP | 2001327545 | | 11/2001 |
| WO | WO 00/09356 | | 2/2000 |
| WO | WO 00/12040 | | 3/2000 |
| WO | WO 00/66060 | | 11/2000 |

* cited by examiner

POWER WHEELCHAIR

RELATED APPLICATION

The present application claims priority from U.S. Provisional Application No. 60/620,481, which was filed Oct. 20, 2004.

BACKGROUND OF THE INVENTION

The present invention relates to wheelchairs, and especially to drive systems used on power wheelchairs.

It is known in the prior art to provide a power wheelchair having two drive wheels. It is further known to provide a power wheelchair having four drive wheels. The advantages of two wheel drive include a high degree of maneuverability and relatively low power consumption. The advantages of four wheel drive include increased traction and obstacle climbing ability, as well as increased speed, acceleration and braking capabilities.

It would be desirable to provide a wheelchair combining the advantages of the two wheel drive configuration and the four wheel drive configuration.

SUMMARY OF THE INVENTION

In a first aspect, the invention is a power wheelchair comprising a frame and first and second drive wheels supported on the frame for rotation about a common first axis of rotation and for contact with a supporting ground surface. A wheel support assembly is also provided and includes at least one support member pivotally connected to the frame. The support member has a first end and a second end. A support assembly drive wheel is connected to the support member proximate the first end. The support assembly drive wheel rotates about a second axis of rotation, which is preferably parallel to the first axis. A non-driven wheel, preferably a castor wheel, is connected to the support member proximate to the second end. An actuator is supported by the frame and is operably connected to the support member to selectively move the support member between a first position and a second position. In the first position the rear non-driven wheel is moved into contact with the supporting surface and the rear drive wheel is moved out of contact with the supporting surface. In the second position the rear drive wheel is moved into contact with the supporting surface.

In a further aspect, a power wheelchair is provided having a frame and first and second drive wheels supported on the frame for rotation about a common first axis of rotation and for contact with a supporting ground surface. First and second wheel support assemblies are provided, each including a support member pivotally connected to the frame and having a first end and a second end. A support assembly drive wheel is connected to the support member proximate the first end for rotation about a second axis of rotation. A non-driven wheel is connected to the support member proximate the second end. An actuator is provided and supported by the frame. An actuating mechanism includes a shaft and first and second linkage mechanisms operably connecting the actuator to the first and second support members. The actuator operates to selectively move the support members between a first position and a second position. In the first position the support assembly drive wheels are moved out of contact with the supporting surface and in the second position the non-driven wheels are moved out of contact with the supporting surface and the support assembly drive wheels are moved into contact with the supporting surface.

It is further contemplated that the power wheelchair may further comprise a sensor for sensing an operating condition of the wheelchair and generating a controller input signal indicative of the operating condition. The operating conditions sensed may include angular orientation of the wheelchair on an inclined supporting surface, loss of traction of one or both of the first and second drive wheels, speed of the wheelchair, acceleration of the wheelchair, and movement of the wheelchair through a turning maneuver. A controller is preferably operatively connected to the sensor and generates a control output signal to control operation of the actuators. One or more sensors for sensing various operating conditions of the wheelchair and generating controller input signals may also be provided. Each input signal is contemplated to be indicative of the operating conditions of the wheelchair. Alternatively or in conjunction with the sensors, a manual switch operably connected to the actuators may be provided to control operation of the actuators.

BRIEF DESCRIPTION OF THE DRAWINGS

For the purpose of illustrating the invention, there are shown in the drawings forms of the invention which are presently preferred; it being understood, however, that this invention is not limited to the precise arrangements and instrumentalities shown.

DETAILED DESCRIPTION OF THE INVENTION

Figure 1A:
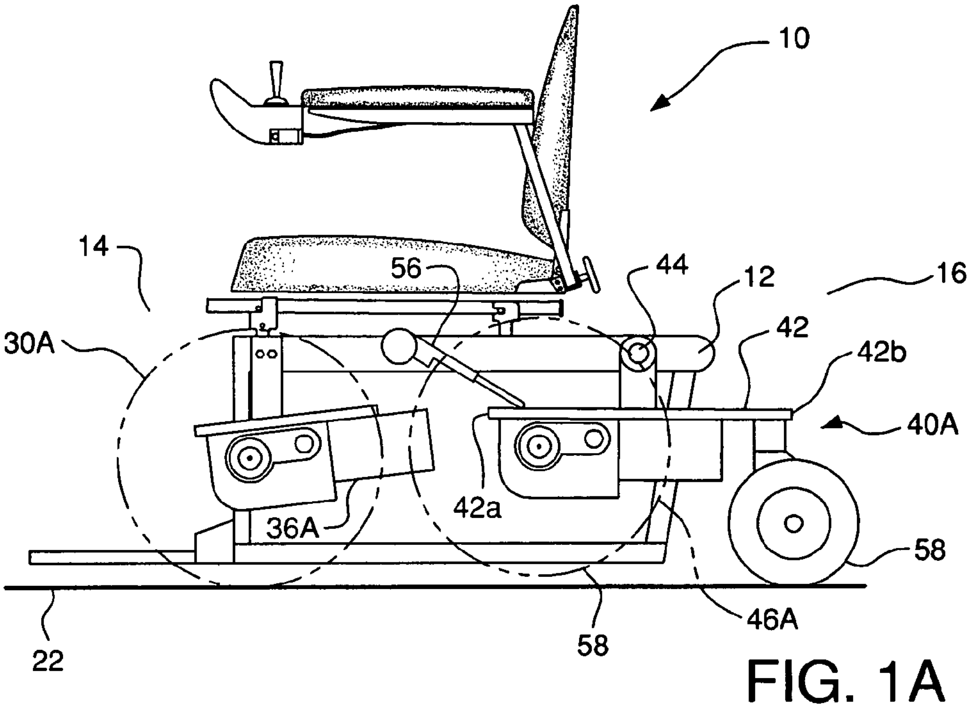
FIG. 1A is a schematic side view of a power wheelchair having a movable wheel support assembly disposed in a first position, in accordance with a first embodiment of the present invention.
Figure 1B:
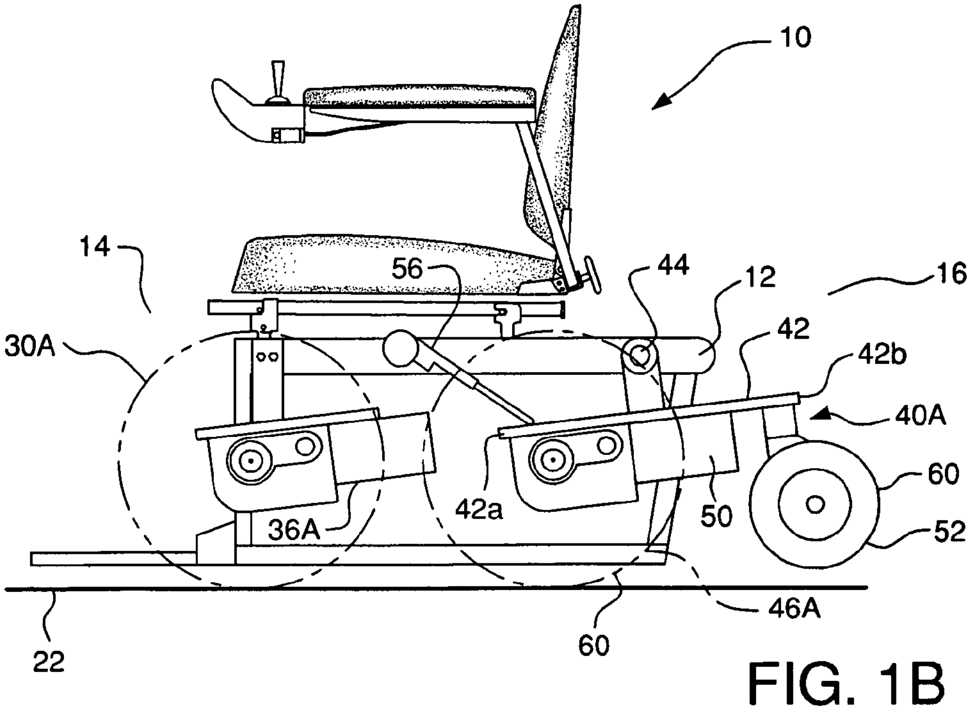
FIG. 1B is a schematic side view of a power wheelchair having a movable wheel support assembly disposed in a second position, in accordance with a first embodiment of the present invention.
Figure 2:
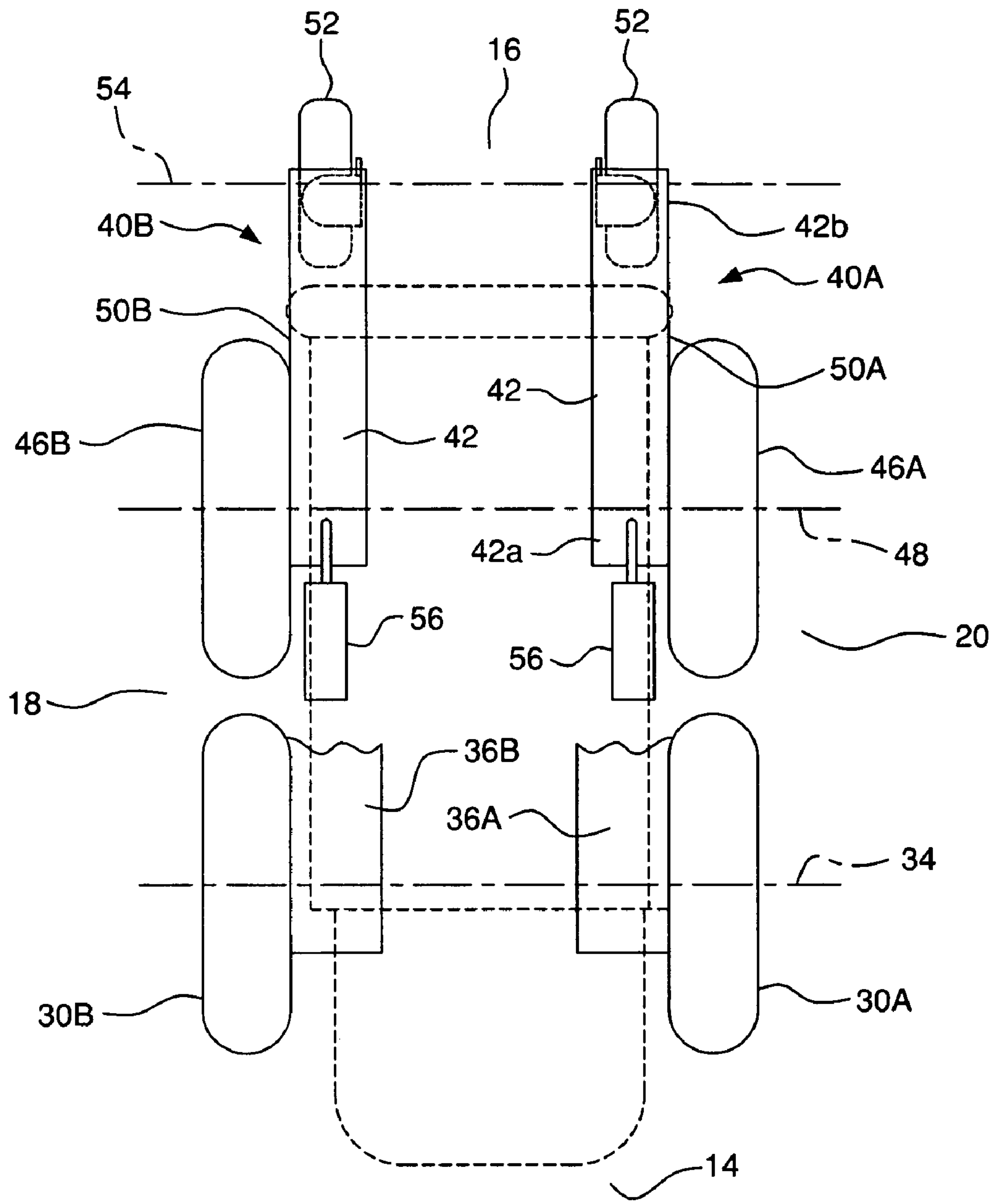
FIG. 2 is a schematic plan view of drive components of the power wheelchair of FIG. 1, wherein other elements of the power wheelchair have been omitted for clarity.

Referring to the drawings, and initially to FIGS. 1 and 2, where like numerals identify like elements, there is illustrated a power wheelchair which is generally identified by the reference numeral 10. The wheelchair 10 includes a frame 12 having a forward end 14 and a rear end 16. The wheelchair 10 has a first lateral side 18 and a second lateral side 20. The wheelchair 10 is shown resting on a supporting surface 22.

The power wheelchair 10 comprises first and second drive wheels 30A and 30B (referred to generally as drive wheels 30) supported by the frame 12 for rotation about a first axis of rotation 34. The drive wheels 30A, 30B are in rolling contact with the supporting surface 22. First and second forward drive motor and gearbox assemblies 36A and 36B (referred to generally as forward drive assemblies 36) are operably coupled with and drive the drive wheels 30.

The power wheelchair 10 further comprises at least a first wheel support assembly 40A. Preferably the wheelchair 10 includes first and second wheel support assemblies 40A and 40B (referred to generally as wheel support assemblies 40). Each wheel support assembly 40 includes a support member 42 pivotally coupled to the frame 12 for rotation about a pivot point 44. The support members 42 have a first end 42*a* and a second end 42*b*. First and second support assembly drive wheels 46A and 46B (referred to generally as support assembly drive wheels 46) are separately coupled to each wheel support member 42 proximate the first end 42*a* for rotation about a second axis of rotation 48. The support assembly drive wheels 46 are operably coupled with and driven for rotation by first and second rear drive motor and gearbox assemblies 50A and 50B (referred to generally as rear drive assemblies 50).

Each wheel support assembly 40 further includes a non-driven wheel 52, coupled to the support member 42 proximate the second end 42*b* for rotation about a third axis of rotation 54. The non-driven wheels 52 are preferably castors, including a biasing mechanism to bias the non-driven wheels 52 normally into an alignment suitable for rolling of the non-driven wheels 52 in a direction generally perpendicular to the first and second axes of rotation 34 and 48. In the interest of providing a compact design, each of the non-driven wheels 52 has a diameter which is less than the diameters of the drive wheels 30 and the support assembly drive wheels 46. Furthermore, the third axis of rotation 54 is preferably located to minimize the overall length of the wheelchair 10.

Each wheel support assembly 40 still further includes an actuator 56 supported by the frame 12 and operably coupled to the support member 42 to selectively pivot the support member 42 between a first position 58 and a second position 60. In the first position 58, the rear non-driven wheels 52 are moved into contact with the supporting surface 22 and the rear drive wheels 46 are moved out of contact with the supporting surface 22. In the second position 60, the rear drive wheels 46 are moved into contact with the supporting surface 22. With reference to FIG. 1, the rear non-driven wheels 52 are illustrated as being moved out of contact with the supporting surface 22 in the second position 60. Alternatively, the rear non-driven wheels 52 could be moved to a position where both the rear drive wheels 46 and the rear non-driven wheels 52 contact the supporting surface 22.

It will be recognized that while the drive wheels 30 are illustrated to be proximate the forward end 14 of the wheelchair 10, the non-driven wheels 52 are illustrated to be proximate the rear end 16, and the support assembly drive wheels 46 are illustrated to be intermediate the drive wheels 30 and the non-driven wheels 52, other arrangements are possible. In particular, the non-driven wheels 52 could be positioned forward both the drive wheels 30 and the support assembly drive wheels 46, or could be positioned intermediate the drive wheels 30 and the support assembly drive wheels 46.

Operation of the actuators 56 may be accomplished in a variety of ways. Control may be accomplished, for example, by a manually activated switch (not shown), which when activated causes the actuators 56 to move the wheel support assemblies 40 into the second position 60, putting the wheelchair 10 into a four-wheel drive configuration. Further, when the manual switch (not shown) is de-activated, the actuators 56 are caused to move the wheel support assemblies 40 into the first position 58, putting the wheelchair 10 into two-wheel drive configuration (more particularly, in the embodiment illustrated, a front wheel drive configuration).

Figure 3:
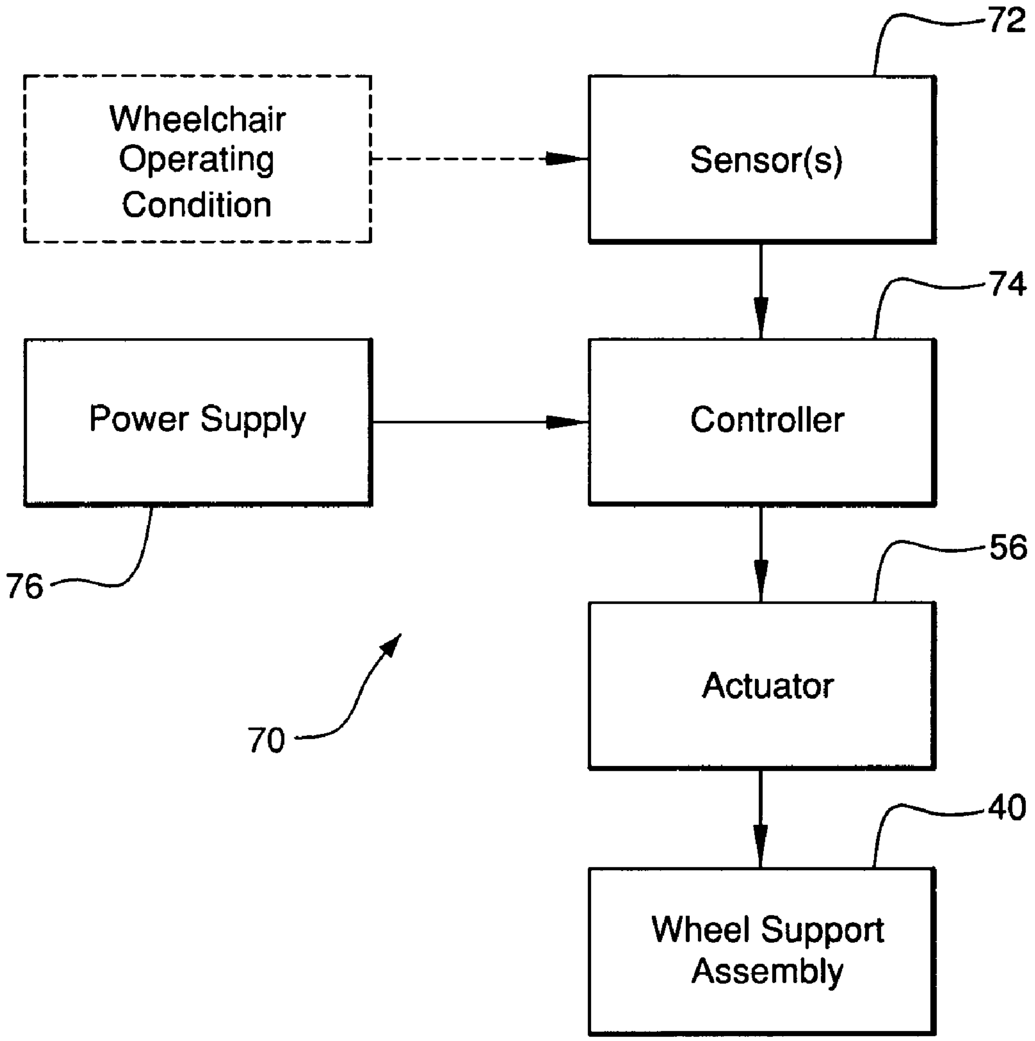
FIG. 3 is a block diagram illustrating a drive wheel configuration control system used to control operation of the movable wheel support assembly of FIG. 1.
Figure 4:
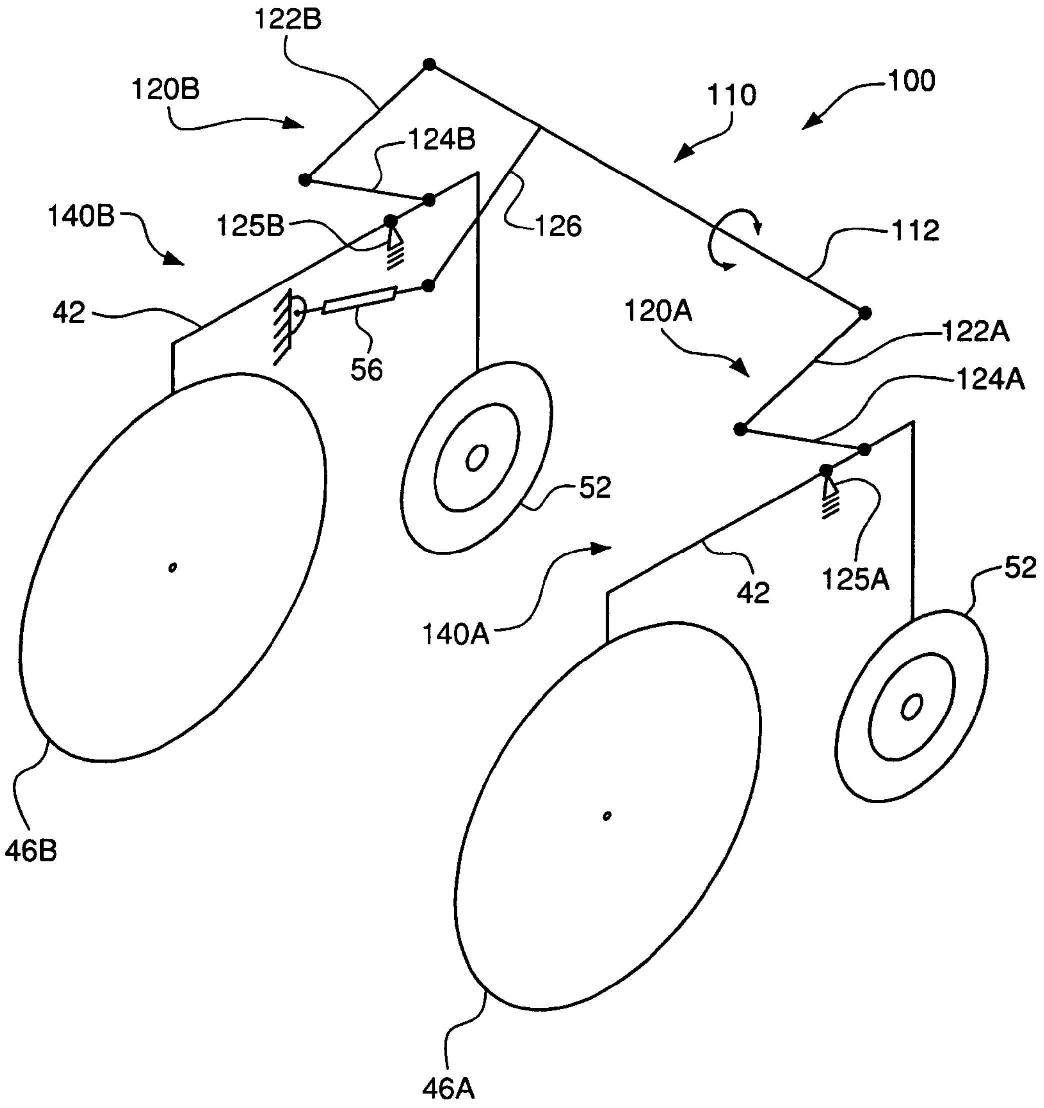
FIG. 4 is a schematic representation of elements of a power wheelchair having a movable wheel support assembly in accordance with a second embodiment of the present invention.
Figure 5:
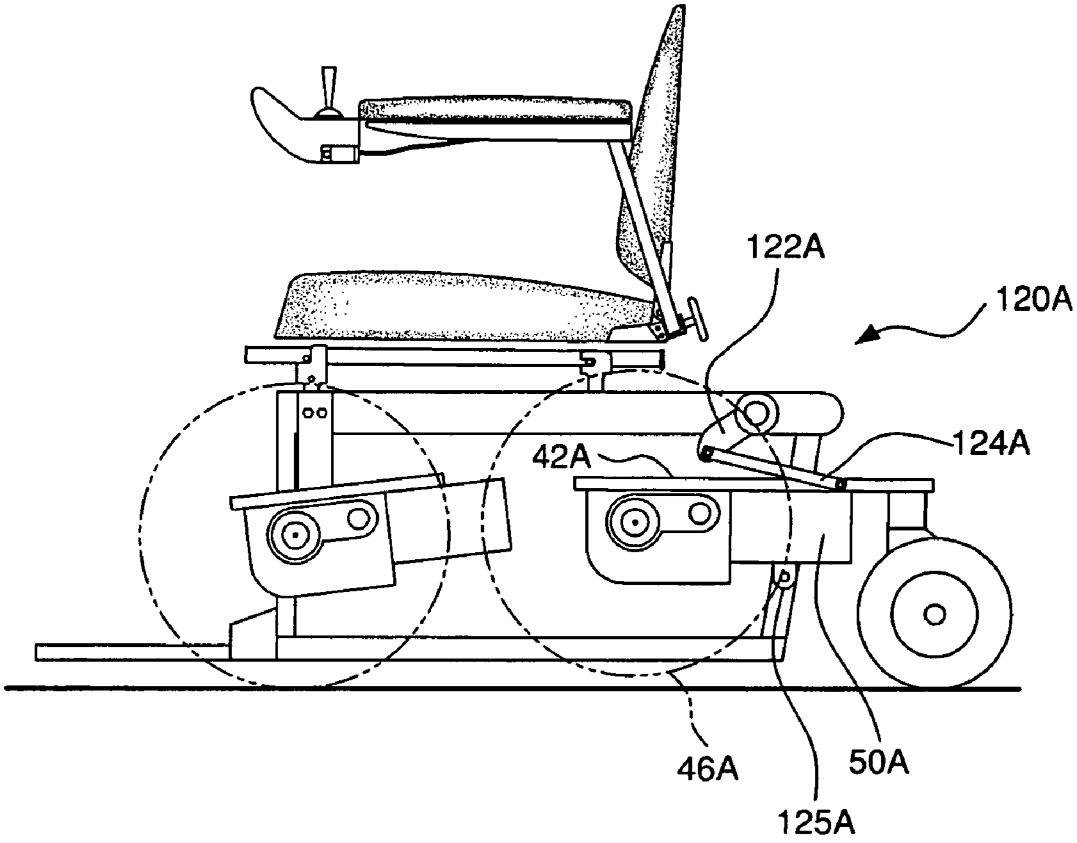
FIG. 5 is a schematic side view of a first side of a power wheelchair having a movable wheel support assembly according to a second embodiment of the present invention.
Figure 6A:
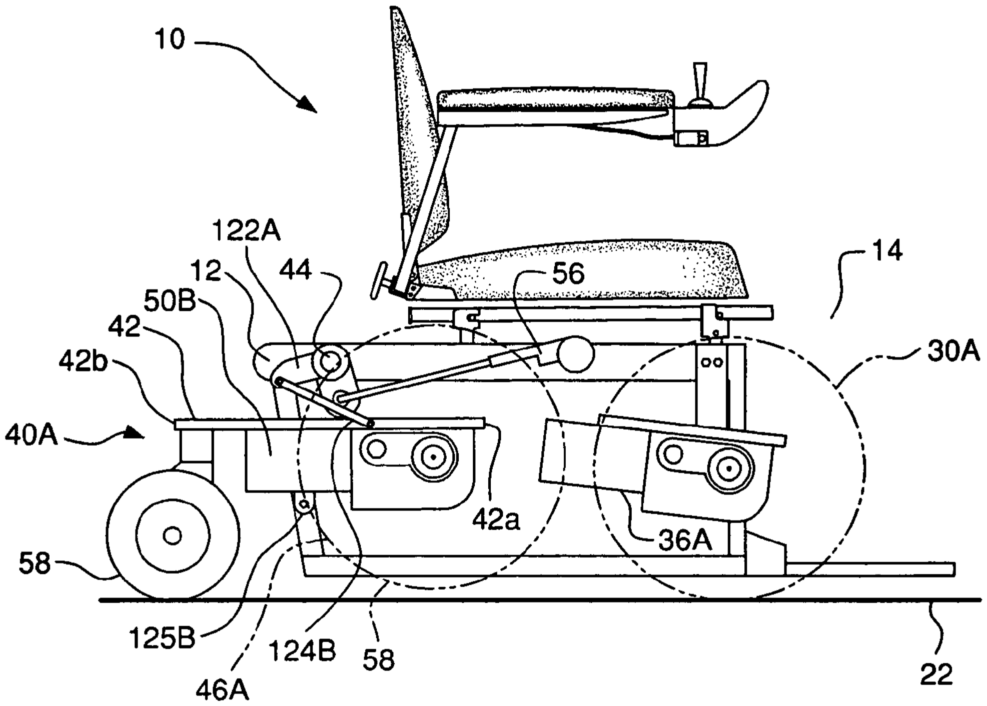
FIG. 6A is a schematic side view a second side of a power wheelchair having a movable wheel support assembly disposed in a first position, in accordance with a second embodiment of the present invention.
Figure 6B:
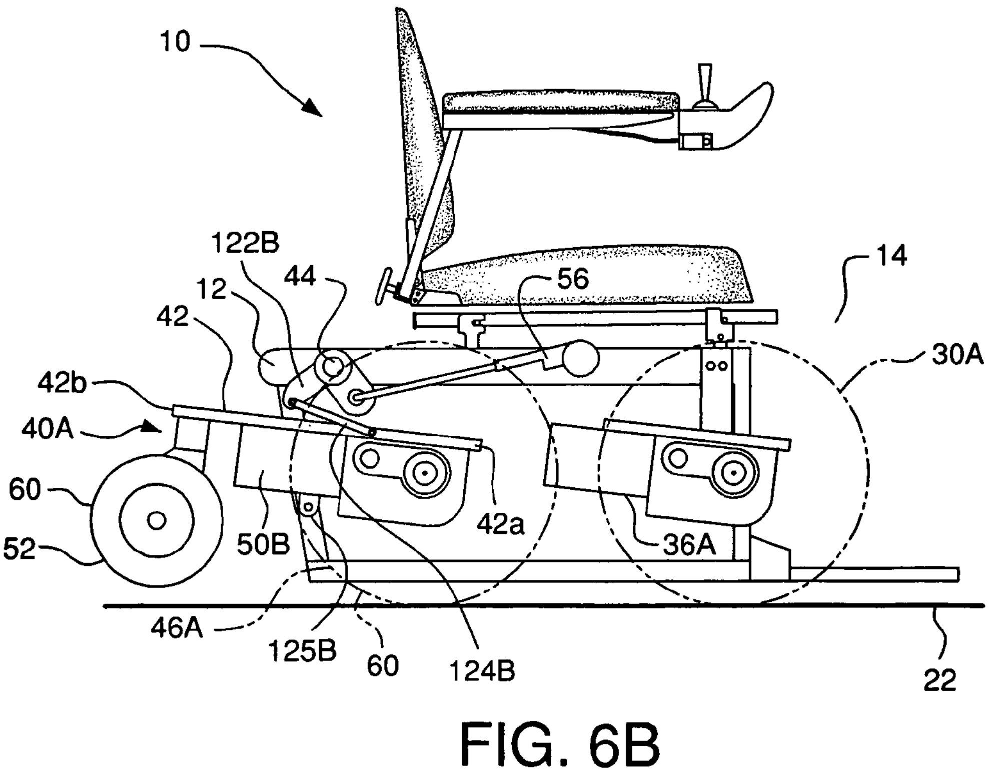
FIG. 6B is a schematic side view of a second side of a power wheelchair having a movable wheel support assembly disposed in a second position, in accordance with a second embodiment of the present invention.
Figure 7:
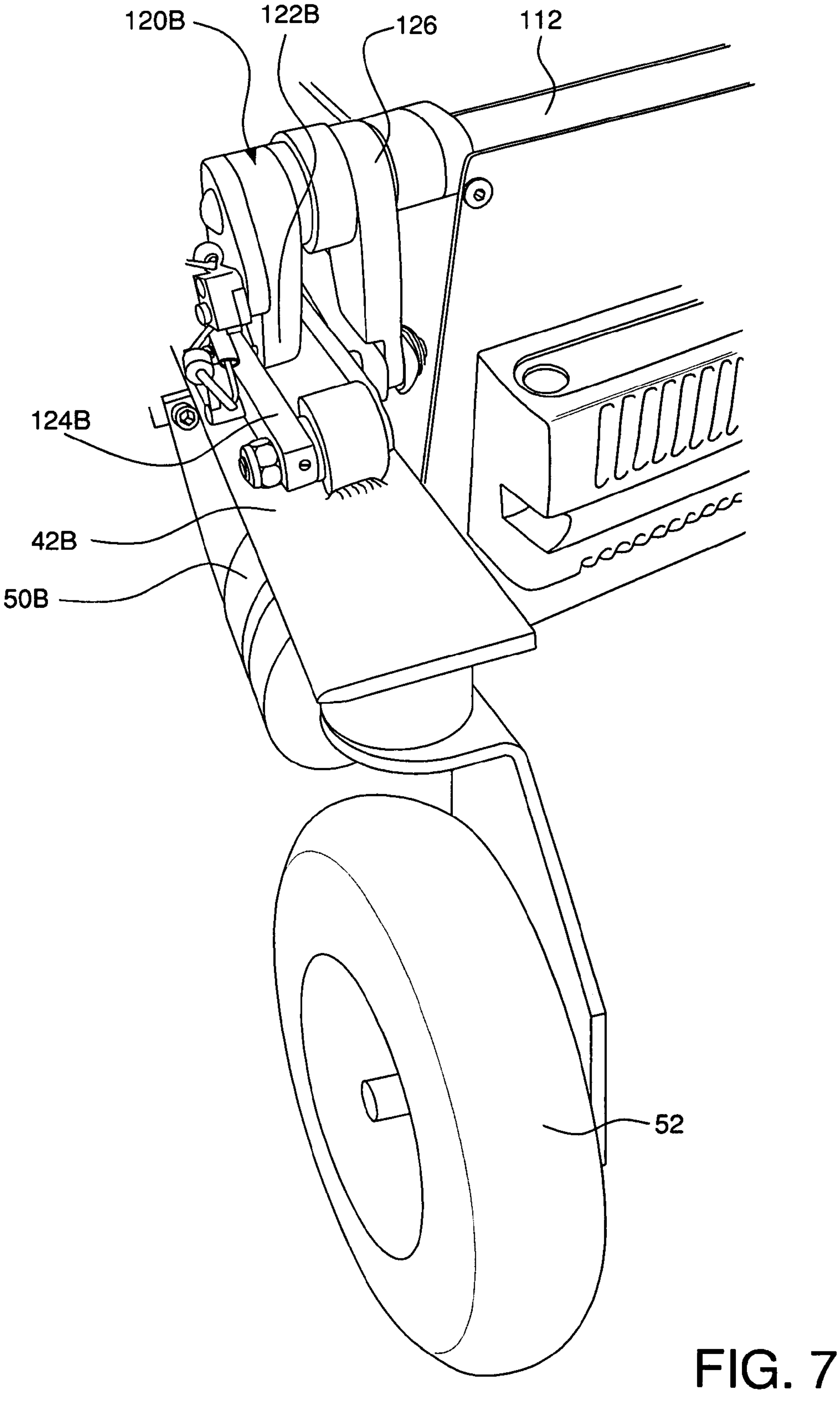
FIG. 7 is a perspective view of a second linkage assembly of the power wheelchair of FIG. 4.

As a further example of how control of operation of the actuators 56 may be accomplished, and with reference to FIG. 3, a drive wheel configuration control system 70 includes a sensor 72 operably coupled to a controller 74. A power supply 76 provides power to the controller 74 and sensor 72, as well as to the actuators 56. The sensor 72 is adapted to sense an operating condition of the wheelchair 10, and to generate an input signal to the controller 74 indicative of the operating condition. For example, the operating condition could be orientation of the wheelchair 10 (forward, rearward, or lateral tilt), operation of a steering control to turn the wheelchair 10, operation of an acceleration or braking control, or detection of loss of traction of one or both forward drive wheels 30. Alternatively, the operating condition could be the position of another component of the wheelchair 10. Still further, the operating condition could include speed or direction of motion or changes thereof.

Depending upon the operating condition or conditions to be monitored, various types of sensors 72 may be employed. For example, to monitor forward, aft or lateral tilt of the wheelchair 10, a tilt sensor, such as a mercury switch or a gyroscopic sensor, could be used. The existence of inertial forces could be inferred from measurements of torque generated by the motor made by a torque sensor. The position of a movable component of the wheelchair 10 (for example, position of one or both of the front wheels 30) could be monitored by a microswitch or a linear variable displacement transducer. Optical sensors could be employed to measure speed.

The controller input signal indicative of the operating condition is transmitted to the controller 74. The controller 74 is operatively coupled to the sensor 72, and is responsive to the controller input signal to generate a control output signal to the actuators 56. The controller 74 may be any signal processing unit capable of receiving the controller input signal, determining the desired control output signal to the actuators 56 via a look-up table or other conventional control logic, and generating the control output signal corresponding to a desired response.

Various types of actuators 56 may be used. A conventional electrically powered linear actuator is illustrated, but a rotary style actuator (not illustrated) positioned at pivot point 44 to rotate the wheel support assemblies 40 between the first position 58 and the second position 60 could also be used. It will be recognized that any actuator capable of producing rotation of the wheel support assemblies 40 between the first position 58 and the second position 60 could be used.

Preferably, actuators 56 generally move simultaneously in a similar manner. However, in certain operating conditions, for example during lateral tilting of the wheelchair 10, it is advantageous for the actuators 56 to move independently. For example, the actuators 56 may independently compensate for lateral tilt to aid in stabilization of the wheelchair 10.

With reference now to FIGS. 2 and 4-7, in a further aspect of the invention, a second embodiment power wheelchair 100 is generally similar to the first embodiment power wheelchair 10. The first and second embodiment power wheelchairs share the frame 12 and the first and second drive wheels 30A and 30B supported on the frame 12 for rotation about a common first axis of rotation 34 and for contact with the supporting ground surface 22. Furthermore, both embodiments include at least one, and preferably two support members 42 pivotally connected to the frame 12, having first end 42*a* and second end 42*b*. Support assembly drive wheels 46A, 46B are connected to the support members 42 proximate the first ends 42*a* for rotation about the second axis of rotation 48. Non-driven wheels 52 are connected to the support members 42 proximate the second ends 42*b*. The actuator 56 is supported by the frame 12. As noted above, positions of the drive wheels 30, non-driven wheels 52 and support assembly drive wheels 46 relative to one another may be varied. Both embodiments include first and second rear drive motor and gearbox assemblies 50A and 50B operatively coupled to the rear drive wheels 46.

The second embodiment power wheelchair 100 is distinguished from the first embodiment power wheelchair 10 in the manner in which the support members 42, support assembly drive wheels 46, and non-driven wheels 52 are moved relative to the wheelchair frame 12. In particular, the second embodiment power wheelchair 100 includes an actuating mechanism 110, having a shaft 112, a link 126, and first and second linkage mechanisms 120A and 120B operably connecting the actuator 56 to the first and second support members 42. Second embodiment first and second wheel support assemblies 140A and 140B are provided.

The first linkage mechanism 120A includes a first link 122A and a second link 124A. The first link 122A is connected to the shaft 112, and rotates with the shaft 112. The first link 122A connects to the second link 124A and the second link 124A connects to the support member 42 of the first wheel support assembly 140A. Rotation of the shaft 112 rotates the first link 122A in turn rotating the second link 124A in turn pivoting the support member 42 of the first wheel support assembly 140A. The support member 42 pivots about the first pivot 125A.

Similarly, the second linkage mechanism 120B includes a first link 122B and a second link 124B. The first link 122B is also connected to the shaft 112 and rotates with the shaft 112. The first link 122B connects to the second link 124B and the second link 124B connects to the support member 42 of the second wheel support assembly 140B. Rotation of the shaft 112 rotates the first link 122B, in turn rotating the second link 124B, in turn pivoting the support member 42 of the second wheel support assembly 140B. The support member 42 pivots about the second pivot 125B. The first pivot 125A and the second pivot 125B are preferably coaxial.

In operation, the actuator 56 operates to rotate the shaft 112 by movement of the link 126. Rotation of the shaft 112 operates the first and second linkage mechanism 120A and 120B to selectively move the support members 42 between the first position 58 and the second position 60. In the first position 58 the support assembly drive wheels 46 are moved out of contact with the supporting surface 22 and in the second position 60 the non-driven wheels 52 are moved out of contact with the supporting surface 22 and the support assembly drive wheels 46 are moved into contact with the supporting surface 22.

Control of the actuator 56 is similar for either the first embodiment power wheelchair 10 or the second embodiment power wheelchair 100.

A wheelchair 10, 100 is thus provided which is readily re-configured between a two wheel drive configuration and a four wheel drive configuration, providing the wheelchair 10, 100 with the capability of selectively realizing the advantages of each of the respective configurations.

The present invention may be embodied in other specific forms without departing from the spirit or essential attributes thereof and, accordingly, reference should be made to the appended claims, rather than to the foregoing specification, as indicating the scope of the invention.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A power wheelchair comprising:

a frame;

first and second drive wheels supported on the frame for rotation about a common first axis of rotation and for contact with a supporting ground surface; and a wheel support assembly including at least one support member pivotally connected to the frame and having a first end and a second end, a support assembly drive wheel connected to the support member proximate the first end for rotation about a second axis of rotation, a non-driven wheel connected to the support member proximate the second end, and an actuator supported by the frame and operably connected to the support member to selectively move the support member between a first position and a second position, wherein in the first position the support assembly drive wheel is moved out of contact with the supporting surface and in the second position the non-driven wheel is moved out of contact with the supporting surface and the support assembly drive wheel is moved into contact with the supporting surface.

2. The power wheelchair of claim 1 further comprising:

a sensor for sensing an operating condition of the wheelchair and generating a controller input signal indicative of the operating condition;

a controller operatively connected to the sensor and responsive to the controller input signal for generating control output signals to control operation of the actuators.

3. The power wheelchair of claim 2 further comprising multiple sensors for sensing multiple operating conditions of the wheelchair and generating multiple controller input signals each indicative of one of the multiple operating conditions.

4. The power wheelchair of claim 2, wherein the sensed operating condition is selected from a group of operating conditions including angular orientation of the wheelchair on an inclined supporting surface, loss of traction of one or both of the first and second drive wheels, speed of the wheelchair, acceleration of the wheelchair, braking of the wheelchair and movement of the wheelchair through a turning maneuver.

5. The power wheelchair of claim 1 further comprising a manual switch operably connected to the actuators to control operation of the actuators.

6. The power wheelchair of claim 1, wherein the non-driven wheels are castors.

7. The power wheelchair of claim 6, wherein the castors each include a biasing member to bias each castor into a predetermined position.

8. A power wheelchair comprising:

a frame;

first and second drive wheels supported on the frame for rotation about a common first axis of rotation and for contact with a supporting ground surface;

first and second wheel support assemblies each including a support member pivotally connected to the frame and having a first end and a second end, a support assembly drive wheel connected to the support member proximate the first end for rotation about a second axis of rotation, and a non-driven wheel connected to the support member proximate the second end, and an actuator supported by the frame;

an actuating mechanism including a shaft and first and second linkage mechanisms operably connecting the actuator to the first and second support members;

wherein the actuator operates to selectively move the support members between a first position and a second position, and wherein in the first position the support assembly drive wheels are moved out of contact with the supporting surface and in the second position the non-driven wheels are moved out of contact with the supporting surface and the support assembly drive wheels are moved into contact with the supporting surface.

* * * * *